US007395055B2

(12) United States Patent
Chitrapu et al.

(10) Patent No.: US 7,395,055 B2
(45) Date of Patent: *Jul. 1, 2008

(54) MOBILE WIRELESS PRESENCE AND SITUATION MANAGEMENT SYSTEM AND METHOD

(75) Inventors: Prabhakar R. Chitrapu, Blue Bell, PA (US); John David Kaewell, Jr., Jamison, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/214,111

(22) Filed: Aug. 29, 2005

(65) Prior Publication Data

US 2006/0025118 A1    Feb. 2, 2006

Related U.S. Application Data

(63) Continuation of application No. 10/739,496, filed on Dec. 18, 2003, now Pat. No. 6,968,185.

(60) Provisional application No. 60/517,657, filed on Nov. 5, 2003.

(51) Int. Cl.
*H04Q 7/20* (2006.01)
*H04M 3/00* (2006.01)
*H04M 1/00* (2006.01)
*H04B 7/00* (2006.01)

(52) U.S. Cl. ............ 455/420; 455/418; 455/414.3; 455/456.1; 455/456.2; 455/456.3; 455/456.4; 455/456.6; 455/550.1; 455/41.2; 455/556.2

(58) Field of Classification Search ... 455/414.1–414.3, 455/410–411, 404.2, 401, 413, 415–420, 455/412.1, 412.2, 423–425, 432.1, 432.2, 455/432.3, 435.1, 435.2, 435.3, 456.1–456.6, 455/433, 457–459, 461–466, 41.2, 517–521, 455/550.2, 556.2, 560–561, 422.1, 565, 513–515, 455/550.1; 709/203, 206, 226, 232, 228–229; 340/539.11, 539.13, 404.2, 7.1, 7.39–7.42, 340/7.58, 539.1, 540–541, 825.49; 715/710, 715/760, 751–753, 758–759, 770, 817; 710/16–19
See application file for complete search history.

(56) References Cited

U.S. PATENT DOCUMENTS

| 6,226,317 | B1 | 5/2001 | Bruckert et al. |
| 6,594,354 | B1 | 7/2003 | Kelly |
| 6,631,271 | B1 | 10/2003 | Logan |
| 6,771,991 | B1 | 8/2004 | Gupta et al. |

(Continued)

FOREIGN PATENT DOCUMENTS

WO    01/20945    3/2001

(Continued)

*Primary Examiner*—Meless Zewdu
(74) *Attorney, Agent, or Firm*—Volpe and Koenig, P.C.

(57) ABSTRACT

A method for controlling the communications of a wireless transmit/receive unit (WTRU) in a wireless network using presence and situation information begins by generating presence and situation information pertaining to the WTRU. The presence and situation data is stored and, subsequently, retrieved upon receipt of a communication at the WTRU. The communication settings of the WTRU are adjusted by using the presence and situation information.

14 Claims, 3 Drawing Sheets

U.S. PATENT DOCUMENTS

| | | |
|---|---|---|
| 6,853,634 B1 | 2/2005 | Davies et al. |
| 6,968,179 B1 * | 11/2005 | De Vries .................. 455/414.1 |
| 2002/0077144 A1 * | 6/2002 | Keller et al. ................ 455/550 |
| 2002/0116461 A1 * | 8/2002 | Diacakis et al. ............. 709/204 |
| 2002/0151297 A1 | 10/2002 | Remboski et al. |
| 2003/0008644 A1 | 1/2003 | Akhterzzaman et al. |
| 2003/0018704 A1 * | 1/2003 | Polychronidis et al. ..... 709/202 |
| 2003/0060215 A1 * | 3/2003 | Graham ...................... 455/456 |
| 2003/0104819 A1 * | 6/2003 | Knauerhase et al. ........ 455/456 |
| 2003/0134626 A1 | 7/2003 | Himmel et al. |
| 2004/0203888 A1 * | 10/2004 | Mikan ..................... 455/456.1 |
| 2004/0243941 A1 * | 12/2004 | Fish ........................... 715/752 |
| 2005/0009537 A1 * | 1/2005 | Crocker et al. ........... 455/456.3 |
| 2005/0058094 A1 * | 3/2005 | Lazaridis et al. ............ 370/328 |
| 2005/0079873 A1 * | 4/2005 | Caspi et al. .............. 455/456.1 |

FOREIGN PATENT DOCUMENTS

| | | |
|---|---|---|
| WO | 02/43351 | 5/2002 |

* cited by examiner

MOBILE WIRELESS PRESENCE AND SITUATION MANAGEMENT SYSTEM AND METHOD

CROSS REFERENCE TO RELATED APPLICATIONS

This application is a continuation of U.S. patent application Ser. No. 10/739,496 filed Dec. 18, 2003, which claims benefit of U.S. Provisional Application No. 60/517,657, filed Nov. 5, 2003, which is incorporated by reference as if fully set forth herein.

FIELD OF THE INVENTION

The present invention generally relates to wireless communication systems, and more particularly, to a system and method for adjusting the operating parameters of a wireless device based upon its presence and situation.

BACKGROUND

Present wireless phones do not include mechanisms to determine a user's location, who the user is with, what the user is doing, or how the user would prefer to be communicated to. This type of knowledge is known as presence and situation information. Presence information relates to both the networks and services that a device is present for (i.e., currently available to utilize). Situation information relates to the situation that the device is currently experiencing, including the physical location of the device, the proximity to other wireless devices, and the environment the user is in.

An example of presence information is "buddy lists" in instant messaging applications. When one of the users in User A's buddy list connects to a network with the instant messaging application, User A receives an indication on his or her screen that the other user has connected to the network (is "present") and may be available for communication. The buddy list also contains information such as when a user is connected to the network, but is not accepting communications.

Situation information is desirable, since wireless phones can be intrusive and sometimes become dangerous distractions by ringing at inappropriate times, such as when the phone owner is engaged in an important conversation, in a meeting, attending religious services, driving in bad weather conditions, or during an airplane takeoff/landing situation (assuming that the phone has been inadvertently left on). It is therefore desirable to incorporate presence and situation information into a wireless phone.

SUMMARY OF THE INVENTION

A method for adjusting the operating parameters of a wireless device for use in a wireless communication network begins by generating and storing situation settings. When a communication is received at the network for the wireless device, the presence of the wireless device is determined. The situation settings are applied based upon the presence of the wireless device. The wireless device is informed of the communication via the applied situation settings.

The presence and situation information for one or more wireless devices is determined by the wireless device itself, by the network, or by a combination of both the device and the network. For example, the presence and situation information may be entered into the wireless device manually, automatically, or semi-automatically. Alternately, the network may determine the location of the wireless device either by itself or in concert with the wireless device. The presence and situation information or part thereof, is then stored in the device, in the network, or in both the device and the network.

A system for adjusting the operating parameters of a wireless device in a wireless communication network includes entering means for entering situation settings; storing means for storing the situation settings; receiving means for receiving a communication at the network for the wireless device; presence means for determining the presence of the wireless device; applying means for applying the situation settings based upon the presence of the wireless device; and informing means for informing the wireless device of the communication via the applied situation settings.

A method for controlling the communications of a wireless device in a wireless network using presence and situation information begins by generating presence and situation information pertaining to the wireless device. The presence and situation information is stored in the wireless device and/or the wireless network. The presence and situation information is retrieved from its stored location and is used to control the communications of the wireless device.

A method for controlling the communications of a wireless transmit/receive unit (WTRU) in a wireless network using presence and situation information begins by generating presence and situation information pertaining to the WTRU. The presence and situation data is stored and, subsequently, retrieved upon receipt of a communication at the WTRU. The communication settings of the WTRU are adjusted by using the presence and situation information.

A wireless transmit/receive unit (WTRU) for use in a wireless communication system includes a presence and situation generator for generating presence and situation information relating to the WTRU, a means for adjusting the operating parameters of the WTRU based on the presence and situation information, and a memory for storing the presence and situation information.

BRIEF DESCRIPTION OF THE DRAWINGS

A more detailed understanding of the invention may be had from the following description of preferred embodiments, given by way of example, and to be understood with reference to the accompanying drawings, in which.

DETAILED DESCRIPTION OF THE PREFERRED EMBODIMENTS

The following discussion uses wireless transmit/receive units (WTRUs) to illustrate the functionality of the present invention. However, it is noted that the present invention can be used with any type of wireless communication device that is capable of connecting to a network. These devices include, but are not limited to, those that contain cellular network capability, wireless local area network (WLAN) capability, Bluetooth connectivity, and the like. Hereafter, a WTRU includes, but is not limited to, a user equipment, a mobile station, a fixed or mobile subscriber unit, a pager, or any other type of device capable of operating in a wireless environment.

Figure 1:
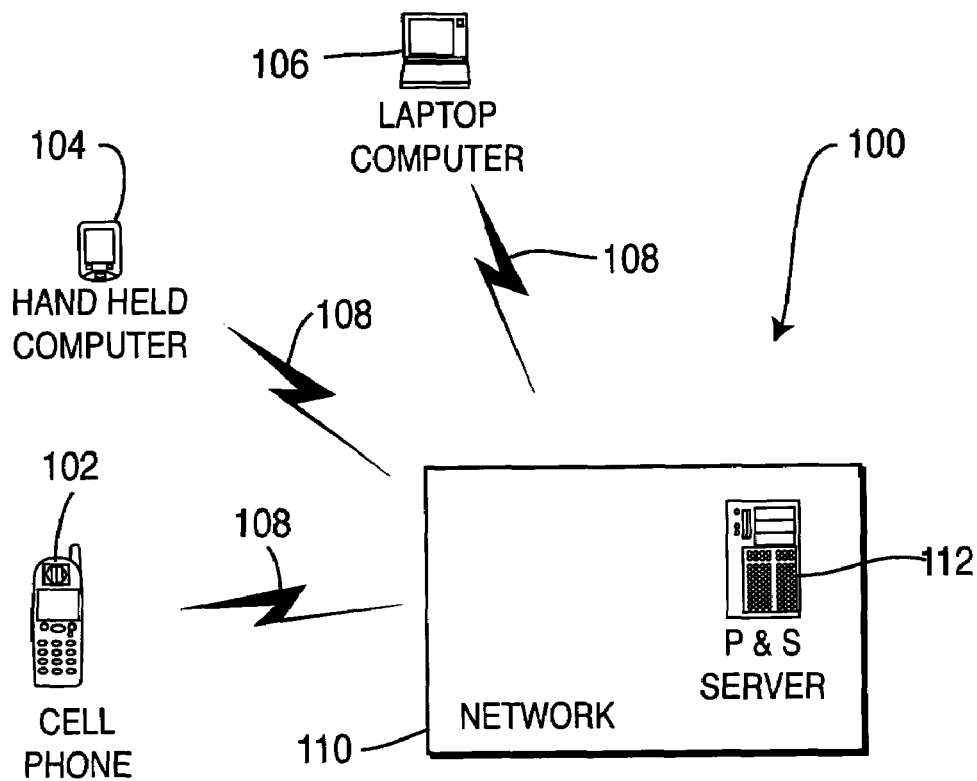
FIG. 1 is a diagram showing an overview of a system using the present invention.

Referring now to FIG. 1, a presence and situation (P&S) management system 100 includes a number of wireless devices, such as a WTRU 102, a hand-held computer 104, and a laptop computer 106. It is noted that these devices are merely examples of the types of devices that can be used in the system 100; any device capable of wirelessly accessing a network can be used with the system 100. The devices 102, 104, 106 communicate via a wireless link 108 with a network 110. The network 110 includes a presence and situation (P&S) management server 112.

The P&S management system 100 has knowledge of a user's current presence and situation information. From this knowledge, the system 100 can determine the availability of the user. For example, if the user is in a meeting and has indicated to the P&S management system the he/she does not want to receive incoming calls, the caller would receive an indication that the user is unavailable.

Figure 2:
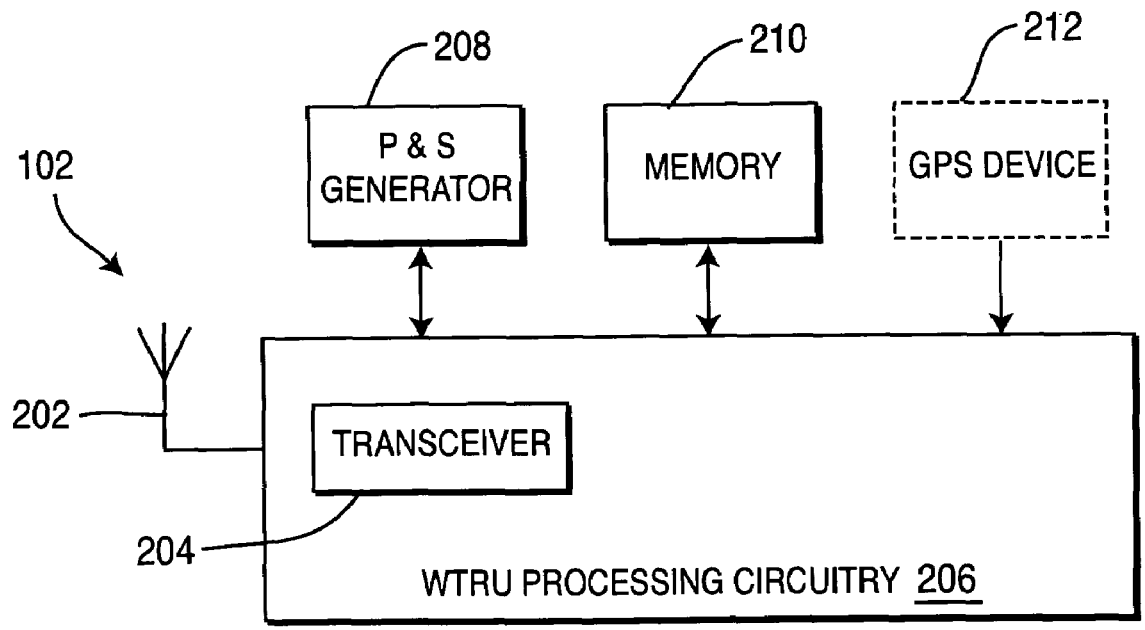
FIG. 2 is a block diagram showing a wireless transmit/receive unit (WTRU) constructed in accordance with the present invention.

A preferred embodiment of a WTRU 102 constructed in accordance with the present invention is shown as a the simplified block diagram in FIG. 2. A WTRU 102 receives and transmits signals using an antenna/antenna array 202 and a transceiver 204. The transceiver 204 is one component in the WTRU processing circuitry 206. A P&S generator 208 automatically generates the presence and situation information, without manual input by the user. A memory 210 is used to store the P&S related information. Alternatively, the P&S information can be stored in the network 110, in a record associated with the user. A GPS device 212 is an optional device that can be included with the WTRU 102 and used to provide location information for the phone.

The P&S information can be populated in one of three ways: manually entered by the user; automatically determined by the user's WTRU 102 (via the P&S generator 208); or detected by the network 110. The manual entering of the information may be done into the WTRU or directly into the P&S management system via a Web-based utility program. In addition, the WTRU 102 can act as a conduit to the network 110 for a group of devices belonging to a single user.

The situation information includes information such as whether the user does not want to receive any incoming calls, no calls except emergencies, or only calls from a list of "buddies/bosses". For example, the user may wish to block all incoming calls when his/her phone is either lost or lent to someone else. Such information can be manually input by the user (e.g., set up a situation management profile). The devices connected to the network 110 have user interfaces that suitably display this information via icons, text, or audio signals.

The location information includes information such as whether the user is in a hospital, in a theater, driving, or in an airplane. This information may be obtained by:

(1) Location-aware phones and map data. The present location of the WTRU 102 can be determined by GPS (by the GPS device 212) or other location technology, such as network-assisted GPS or triangulation techniques utilizing the cellular network. The map data can be stored in either the WTRU 102 or on the network 110.

(2) Learned automatically via peer-mode connections to other peer entities. For example, hospitals may have Bluetooth transponders, which constantly broadcast their own information, which can be picked up by a WTRU 102 that roams into the hospital.

(3) Alternately, the phone network, which is capable of knowing the phone location, may send a message to the WTRU 102 to update the situation information.

Figure 3:
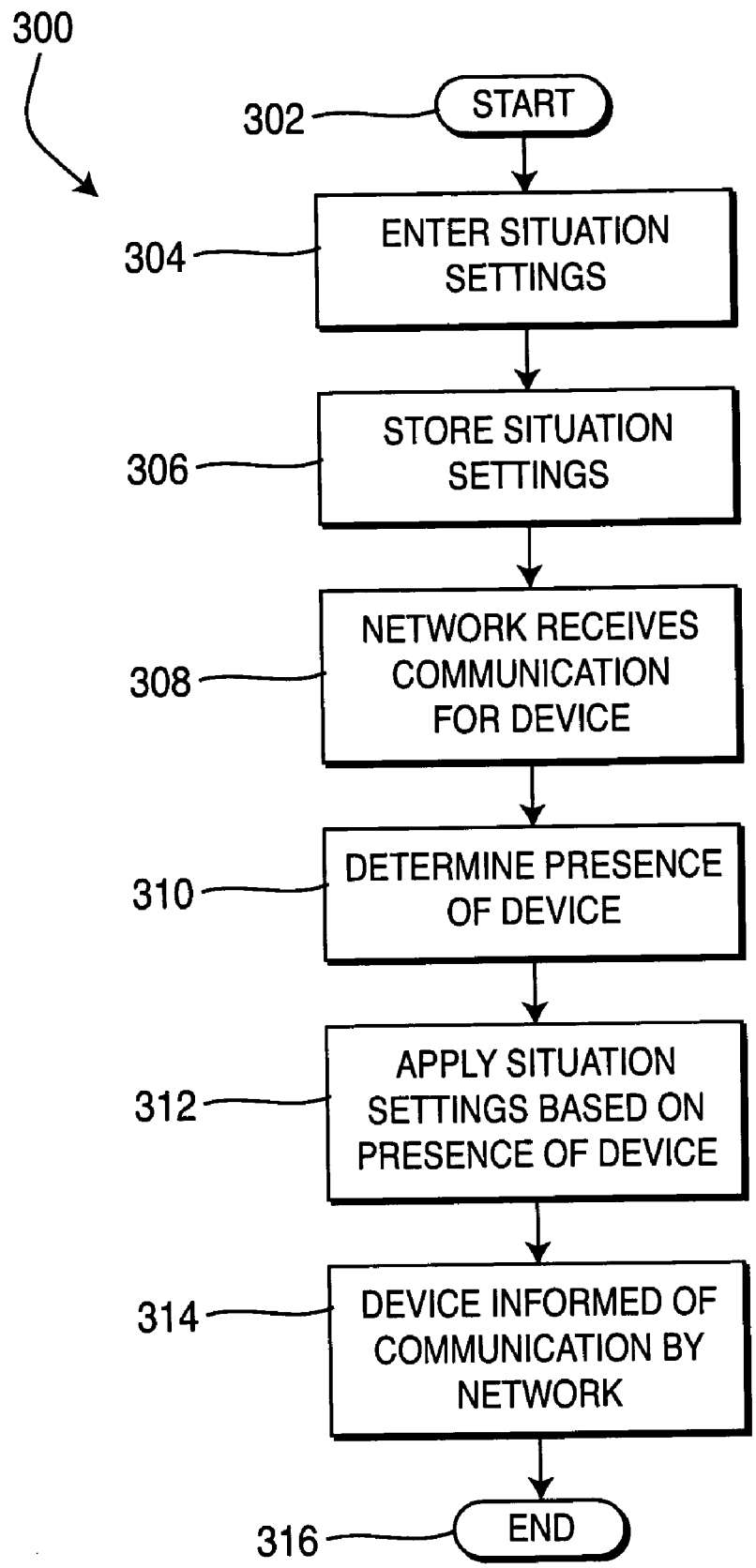
FIG. 3 is a flowchart showing a method in accordance with the present invention.

FIG. 3 shows a flowchart of a method 300 utilizing the P&S information in accordance with the present invention. The method 300 begins (step 302) by entering the situation settings desired by the user via the user's wireless device (step 304). The situation settings are then stored in the device or on the network (step 306). When the network receives a communication for the device (step 308), the presence of the device is determined (step 310).

After the presence of the device is determined, the situation settings are applied, based upon the presence information (step 312). The situation settings can be applied at either the device or the network. After the situation settings are applied, the device is informed of the communication by the network (step 314), and the method terminates (step 316).

Figure 4:
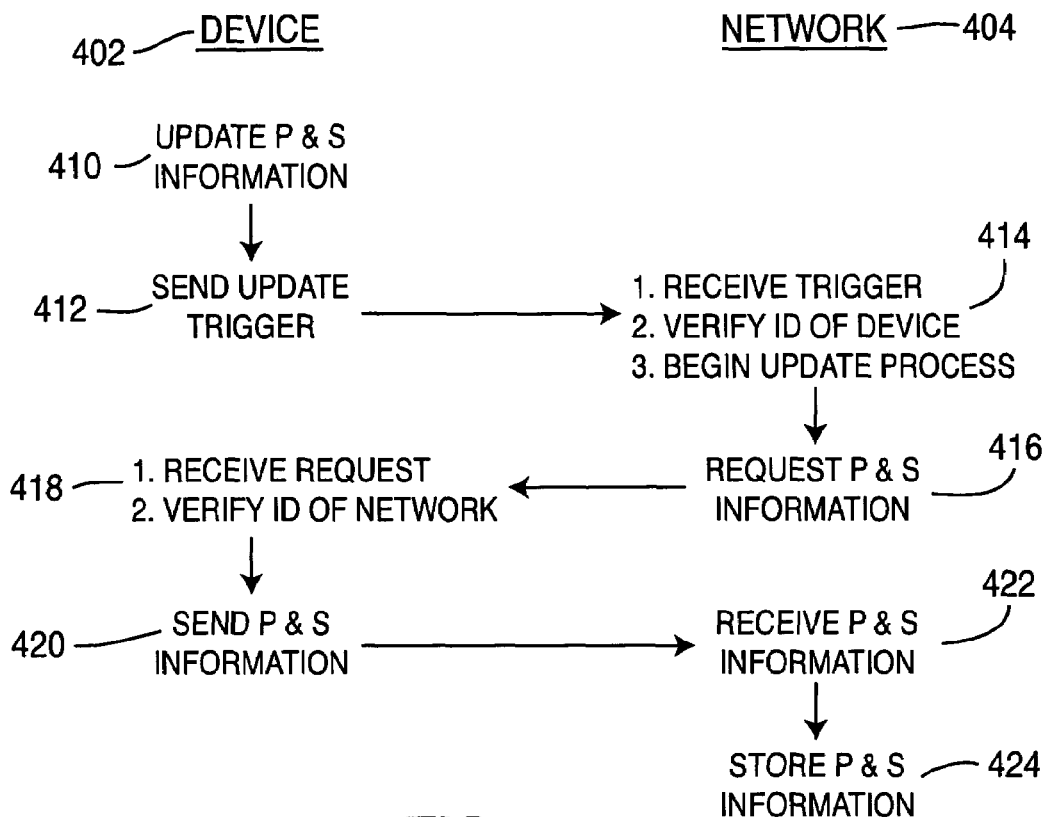
FIG. 4 is a diagram showing the exchange of messages during an information update in accordance with the present invention.

FIG. 4 shows a series of message exchanges 400 between the device 402 and the network 404, which is used to synchronize the P&S information of the user between the device 402 and the network 404. When the P&S information is updated at the device (block 410), an update trigger 412 is sent by the device 402. The network 404 receives the update trigger, verifies the identity of the device 402, and begins the update process (block 414).

The network 404 request the P&S information from the device 402 (block 416). The device 402 receives the update request and verifies the identity of the network (block 418). The device 402 then sends the P&S information to the network (block 420). The network 404 receives the P&S information (block 422) and stores the P&S information (block 424).

The verification steps performed at blocks 414 and 418 are designed to add a level of security to the synchronization process, by ensuring that the information transfer between the device 402 and the network 404 is authorized, and that neither the device 402 nor the network 404 are communicating with any unauthorized devices. Based on the synchronized P&S information, the network appropriately handles the signaling and traffic flow to and from the user. Since the network has knowledge of the user's current P&S information, it can properly signal the user according to the situation settings previously established. The network may restrict incoming calls if the user is in a hospital or library. It may send a short message service (SMS) message instead of a ring tone.

Figure 5:
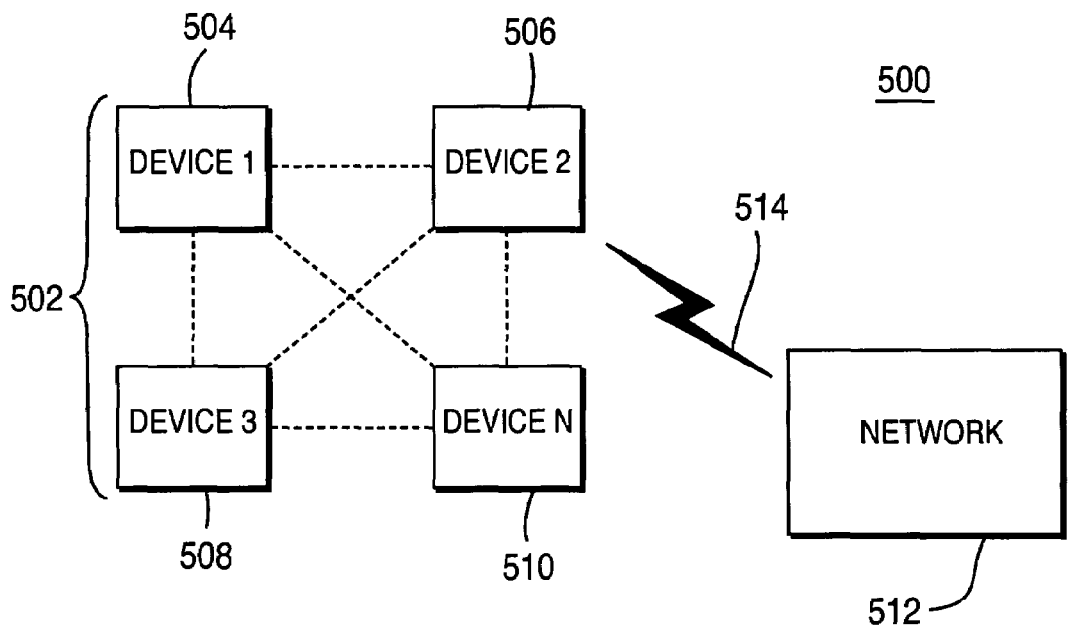
FIG. 5 is a block diagram showing a user's personal area network operating in a system constructed in accordance with the present invention.

Referring now to FIG. 5, a system 500 includes a user's personal area network (PAN) 502 having several devices 504, 506, 508, and 510. The devices 504-510 can communicate with each other through any available medium in an ad hoc manner; the connections between the devices 504-510 are shown as dashed lines to indicate the non-permanent nature of these connections. The PAN 502 communicates with a network 512 via a wireless link 514. While the wireless link 514 is shown connecting the network 512 and device 506, the network can communicate with any device 504-510 of the PAN 502.

When the network 512 is communicating with a PAN 502, it can take actions not available when communicating with a single device, such as sending the call to a different device 504-510 (i.e., call forwarding) or communicating generally with the user's PAN 502, with the PAN routing the communication to the appropriate device. For example, if an audio file is being sent to the user, the audio file could be routed to the user's standalone audio player, instead of their phone. Similarly, the network 512 may disable the user from making or receiving any calls (for example, if he is in airplane). The configuration options available for the situation settings are only limited by the capabilities of the devices 504-510 in the user's PAN 502.

While the present invention has been described above in connection with wireless mobile devices, it is also applicable to nomadic wired devices, such as a laptop that is attached to different subnets. The only differences between the operation of the invention in the "nomadic wired" setting is that the situation information is likely to be different; otherwise, the invention operates in the same manner as described above.

The present invention can also be used by soldiers. In such an embodiment, the general operation of the invention is the same, but the P&S information is updated with greater frequency, as this information can be crucial in a military setting. For example, the invention can be used in a military setting with an ad hoc network, where there are multiple moving devices that need to be in communication with each other. The P&S information is exchanged between devices connected to the ad hoc network before being passed to the main network. It is also possible to use a mesh network in this setting, in which each device connected to the mesh network receives at least some of the information, but perhaps not all of the information. In order to obtain a complete P&S picture of all of the devices connected to the mesh network, the information will need to be fused together from the different devices.

It is noted that the present invention can be used with both packet-switched (used with certain types of services) and circuit-switched ("always connected") technologies. While specific embodiments of the present invention have been shown and described, many modifications and variations could be made by one skilled in the art without departing from the scope of the invention. The above description serves to illustrate and not limit the particular invention in any way.

What is claimed is:

1. A method for controlling the communications of a wireless transmit/receive unit (WTRU) using presence and situation information, comprising:
    generating the presence and situation information pertaining to the WTRU, including automatically generating the presence and situation information by a local communication between the WTRU and other peer WTRUs;
    sending a portion of the presence and situation information to be stored in a plurality of said other peer WTRUs;
    retrieving the presence and situation information from the plurality of said other peer WTRUs upon receipt of a communication at the WTRU from one of the plurality of said other peer WTRUs; and
    adjusting the communication settings of the WTRU by using the retrieved presence and situation information from said other peer WTRUs.

2. The method according to claim 1, wherein said generating includes manually entering the presence and situation information into the WTRU.

3. The method according to claim 1, wherein said generating includes automatically generating the presence and situation information by sensing the location of the WTRU.

4. The method according to claim 1, wherein said generating includes automatically generating the presence and situation information by local communication between the WTRU and a wireless network.

5. The method according to claim 1, wherein said generating includes generating the presence and situation information by a wireless network based upon measurements made by the wireless network on the WTRU.

6. The method according to claim 1, wherein said generating includes generating the presence and situation information by the wireless network based upon measurements reported from the WTRU to a wireless network.

7. The method according to claim 1, wherein the presence information includes a list of users on a buddy list.

8. The method according to claim 1, wherein the situation information includes the physical location of the WTRU.

9. The method according to claim 1, wherein said controlling includes blocking an incoming call.

10. The method according to claim 1, wherein
    the presence information includes the networks and communication services that the WTRU is able to access;
    the situation information includes situation settings relating to a situation of the WTRU; and
    the situation is selected from the group comprising: a physical location of the WTRU, a proximity to other WTRUs, and an environment a user of the WTRU is in.

11. A wireless transmit/receive unit (WTRU), comprising:
    a presence and situation generator configured to generate the presence and situation information relating to the WTRU, wherein said generator is configured to automatically generate the presence and situation information by a local communication between the WTRU and other peer WTRUs;
    a memory for storing the presence and situation information a processor configured to allocate portions of said presence and situation information across a plurality of said other peer WTRUs; for storage therein
    a controller configured to adjust operating parameters of the WTRU based on said presence and situation information received from said plurality of said other peer WTRUs.

12. The WTRU according to claim 11, further comprising a global positioning system device.

13. The WTRU according to claim 11, further comprising an indicator for informing a user of a wireless communication via applied situation settings.

14. A method for controlling communications of a wireless transmit/receive unit (WTRU) using presence and situation information, comprising:
    generating the presence and situation information pertaining to the WTRU, including automatically generating the presence and situation information by a local communication between the WTRU and other peer WTRUs;
    sending a portion of the presence and situation information to be stored in a plurality of said other peer WTRUs;
    retrieving the presence and situation information from the plurality of said other peer WTRUs upon receipt of a communication at the WTRU from one of the plurality of said other peer WTRUs; and
    from the plurality of said other peer WTRUs, routing user data requests to a peer WTRU, in the plurality of said other peer WTRUs, locally connected to the user's Personal Area Network based on the presence and situation information.

* * * * *